(12) United States Patent
Honda

(10) Patent No.: US 12,298,174 B2
(45) Date of Patent: May 13, 2025

(54) WEIGHT MEASUREMENT DEVICE AND LOAD CELL UNIT

(71) Applicant: Tanita Corporation, Tokyo (JP)

(72) Inventor: Akihisa Honda, Tokyo (JP)

(73) Assignee: Tanita Corporation, Tokyo (JP)

(*) Notice: Subject to any disclaimer, the term of this patent is extended or adjusted under 35 U.S.C. 154(b) by 425 days.

(21) Appl. No.: 17/680,159

(22) Filed: Feb. 24, 2022

(65) Prior Publication Data
US 2022/0178736 A1 Jun. 9, 2022

Related U.S. Application Data

(63) Continuation of application No. PCT/JP2020/031266, filed on Aug. 19, 2020.

(30) Foreign Application Priority Data

Sep. 6, 2019 (JP) ................ 2019-162806

(51) Int. Cl.
 G01G 21/28 (2006.01)
 G01G 5/00 (2006.01)
 G01G 21/08 (2006.01)

(52) U.S. Cl.
 CPC ............. *G01G 21/28* (2013.01); *G01G 5/003* (2013.01); *G01G 21/08* (2013.01)

(58) Field of Classification Search
 CPC ........ G01G 21/28; G01G 5/003; G01G 21/08; G01G 23/002; G01G 21/23; G01G 23/00

(Continued)

(56) References Cited

U.S. PATENT DOCUMENTS 4,196,784 A * 4/1980 Suzuki ................ G01G 3/1412
 73/862.633
4,577,709 A * 3/1986 Shibahara .............. G01G 21/23
 73/862.633

(Continued)

FOREIGN PATENT DOCUMENTS

EP  2273243 A1  1/2011
JP  H07-014329 U  3/1995

(Continued)

OTHER PUBLICATIONS

International Search Report issued in related International Patent Application No. PCT/JP2020/031266 dated Sep. 15, 2020.

(Continued)

*Primary Examiner* — Jacques M Saint Surin
(74) *Attorney, Agent, or Firm* — Morgan, Lewis & Bockius LLP

(57) ABSTRACT

A weight measurement device comprises: a housing cover to receive weight of a measurement target; a plurality of load cells to support the housing cover and detect the weight; a housing base comprising, for each of the plurality of load cells, a recessed and projected shape part comprising: a recessed part open upward to at least partially contain each load cell and fix the load cell; and a projected part projected downward corresponding to the recessed part; and an adjustment leg which at least partially contains the recessed and projected shape part, and comprises an adjustment mechanism part for height position adjustment at a position opposed to a side part of the recessed and projected shape part.

12 Claims, 15 Drawing Sheets

(58) Field of Classification Search
USPC .......................................................... 177/180
See application file for complete search history.

(56) References Cited

U.S. PATENT DOCUMENTS

| | | | | |
|---|---|---|---|---|
| 6,336,820 B2* | 1/2002 | Hida | ...................... | H01R 24/46 |
| | | | | 200/51.1 |
| 6,797,894 B2* | 9/2004 | Montagnino | .......... | G01G 21/22 |
| | | | | 177/253 |
| 7,076,990 B2* | 7/2006 | Yoshikuwa | .......... | G01G 23/012 |
| | | | | 73/862.633 |
| 8,648,267 B2* | 2/2014 | Honda | .................. | G01G 21/244 |
| | | | | 177/DIG. 9 |
| 9,726,559 B2* | 8/2017 | Bodmer | ............... | G01G 21/244 |

FOREIGN PATENT DOCUMENTS

| | | |
|---|---|---|
| JP | 3493410 B2 | 2/2004 |
| JP | 2013-011489 A | 1/2013 |
| WO | 2017/118683 A1 | 7/2017 |

OTHER PUBLICATIONS

Extended European Search report dated Mar. 17, 2023, issued in corresponding European Patent Application No. 20861300.0.
Extended European Search Report Issued in corresponding European Patent Application No. 24188923.7 dated Oct. 10, 2024.

* cited by examiner

FIG.13
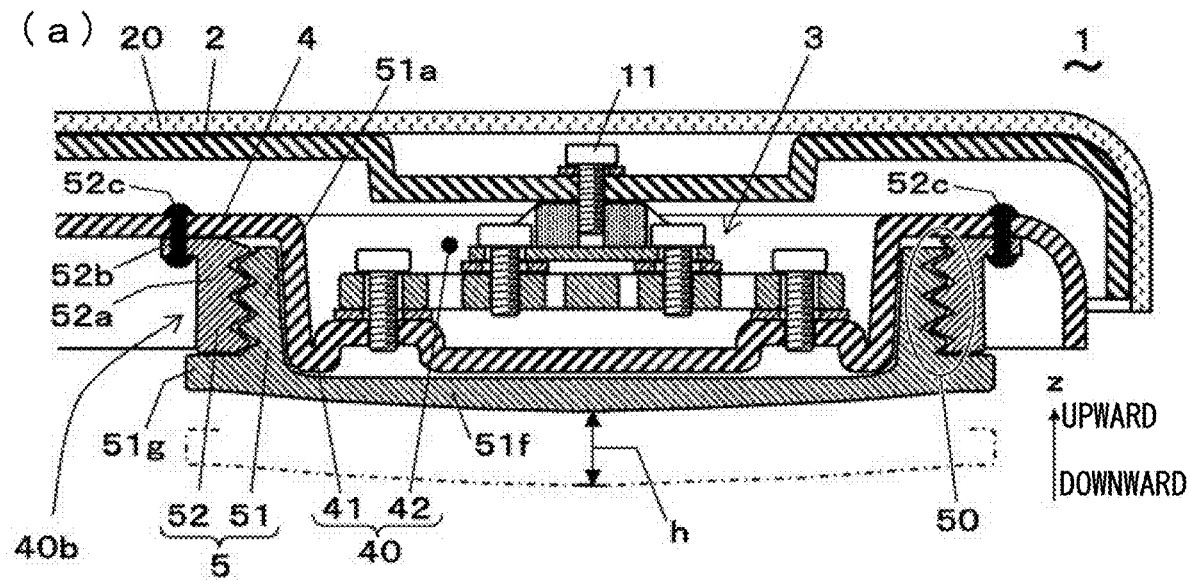
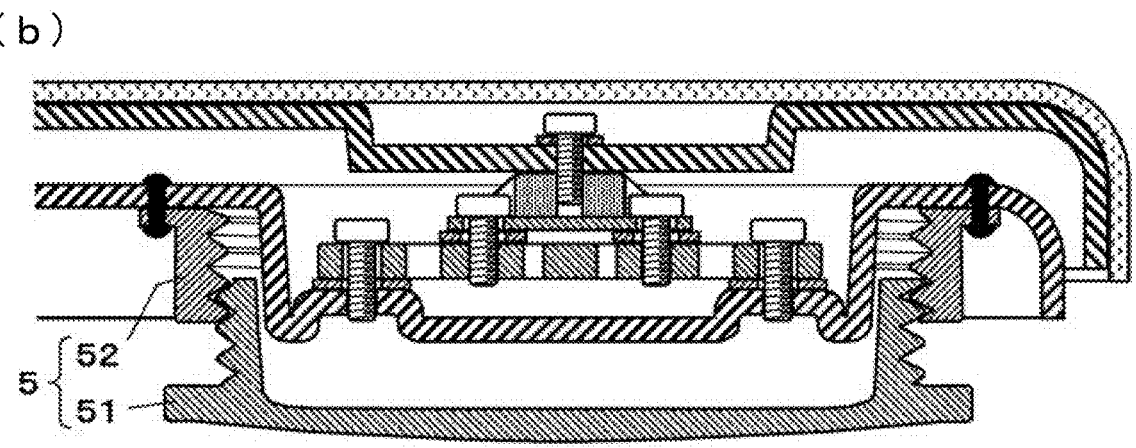

WEIGHT MEASUREMENT DEVICE AND LOAD CELL UNIT

TECHNICAL FIELD

The present invention relates to a weight measurement device comprising adjustment legs and to a load cell unit.

BACKGROUND ART

When a weight measurement device is placed on an inclined surface to measure a weight, the weight does not act perpendicular to the weight measurement device, thus making it impossible to obtain an accurate output of the weight. In order to solve this, there is conventionally known a weight measurement device comprising adjustment legs with a function (leveling function) to place the weight measurement device horizontally. The types of structural forms of a weight measurement device with adjustment legs are broadly divided into devices of a type with a structural form in which the adjustment legs are provided directly below load cells (for example, refer to Patent Document 1), and devices of a type with a structural form in which the adjustment legs are provided at positions remote from the load cells (for example, refer to Patent Document 2).

PRIOR ART DOCUMENTS

Patent Documents

[Patent Document 1] Japanese Laid-open Utility Model Publication Hei 07-014329
[Patent Document 2] Japanese Laid-open Patent Publication 2013-011489

SUMMARY OF THE INVENTION

Problem to be Solved by the Invention

However, in a device as shown in Patent Document 1 described above, the adjustment legs are provided at positions directly below the load cells in order for the device to obtain a predetermined performance, causing the total thickness of the device to be large. Further, in a device as shown in Patent Document 2, the adjustment legs are present at positions remote from the load cells, and therefore it results in a rigid structure to obtain a given performance, causing the total thickness of the device to be large.

An object of the present invention is to solve the problems described above and to provide a weight measurement device and a load cell unit comprising adjustment legs which can obtain a given performance, and can achieve a reduction in the total thickness.

Means to Solve the Problem

In order to solve the above problem, a weight measurement device according to a first aspect of the present invention comprises: a housing cover to receive weight of a measurement target; a plurality of load cells to support the housing cover and detect the weight; a housing base comprising, for each of the plurality of load cells, a recessed and projected shape part comprising: a recessed part open upward to at least partially contain each load cell and fix the load cell; and a projected part projected downward corresponding to the recessed part; and an adjustment leg which at least partially contains the recessed and projected shape part, and comprises an adjustment mechanism part for height position adjustment at a position opposed to a side part of the recessed and projected shape part.

Further, a load cell unit according to a second aspect of the present invention comprises: a housing cover to receive weight of a measurement target; a load cell to support the housing cover and detect the weight; a housing base comprising a recessed and projected shape part comprising: a recessed part open upward to at least partially contain the load cell and fix the load cell; and a projected part projected downward corresponding to the recessed part; and an adjustment leg which at least partially contains the recessed and projected shape part, and comprises an adjustment mechanism part for height position adjustment at a position opposed to a side part of the recessed and projected shape part.

Further, a weight measurement device according to a third aspect of the present invention comprises: a plurality of load cell units placed in a plane; and a common cover to integrate housing covers of the plurality of load cell units with each other, wherein each of the plurality of load cell units comprises: the housing cover; a load cell to support the housing cover and detect weight of a measurement target; a housing base comprising a recessed and projected shape part comprising: a recessed part open upward to at least partially contain the load cell and fix the load cell; and a projected part projected downward corresponding to the recessed part; and an adjustment leg which at least partially contains the recessed and projected shape part, and comprises an adjustment mechanism part for height position adjustment at a position opposed to a side part of the recessed and projected shape part.

Effects of the Invention

According to the weight measurement device of the first aspect, and the weight measurement device of the third aspect of the present invention, the load cell is contained in and fixed to the recessed part, open upward, of the recessed and projected shape part, and the adjustment leg comprising the adjustment mechanism part for height position adjustment is provided at a position opposed to the side part of the projected part projected downward corresponding to the recessed part in which the load cell is contained and fixed. Therefore, it is possible to reduce an increase in the total thickness due to the adjustment leg and obtain a given performance and achieve a reduction in the total thickness of the device. Further, according to the load cell unit of the second aspect of the present invention, the adjustment leg comprising the adjustment mechanism part for height position adjustment is provided at a position opposed to the side part of the projected part of the recessed and projected shape part in which the load cell is contained and fixed. Therefore, it is possible to reduce an increase in the total thickness of the load cell unit due to the adjustment leg, and to obtain a given performance and achieve a reduction in thickness of the load cell unit.

BRIEF DESCRIPTION OF THE DRAWINGS

FIG. 13 (*a*) is a cross-sectional view of a part of a weight measurement device according to a second exemplary embodiment including an adjustment leg and a load cell, while (*b*) is a cross-sectional view showing a state in which the adjustment leg of (*a*) is extended.

DESCRIPTION OF EMBODIMENTS

Figure 1:
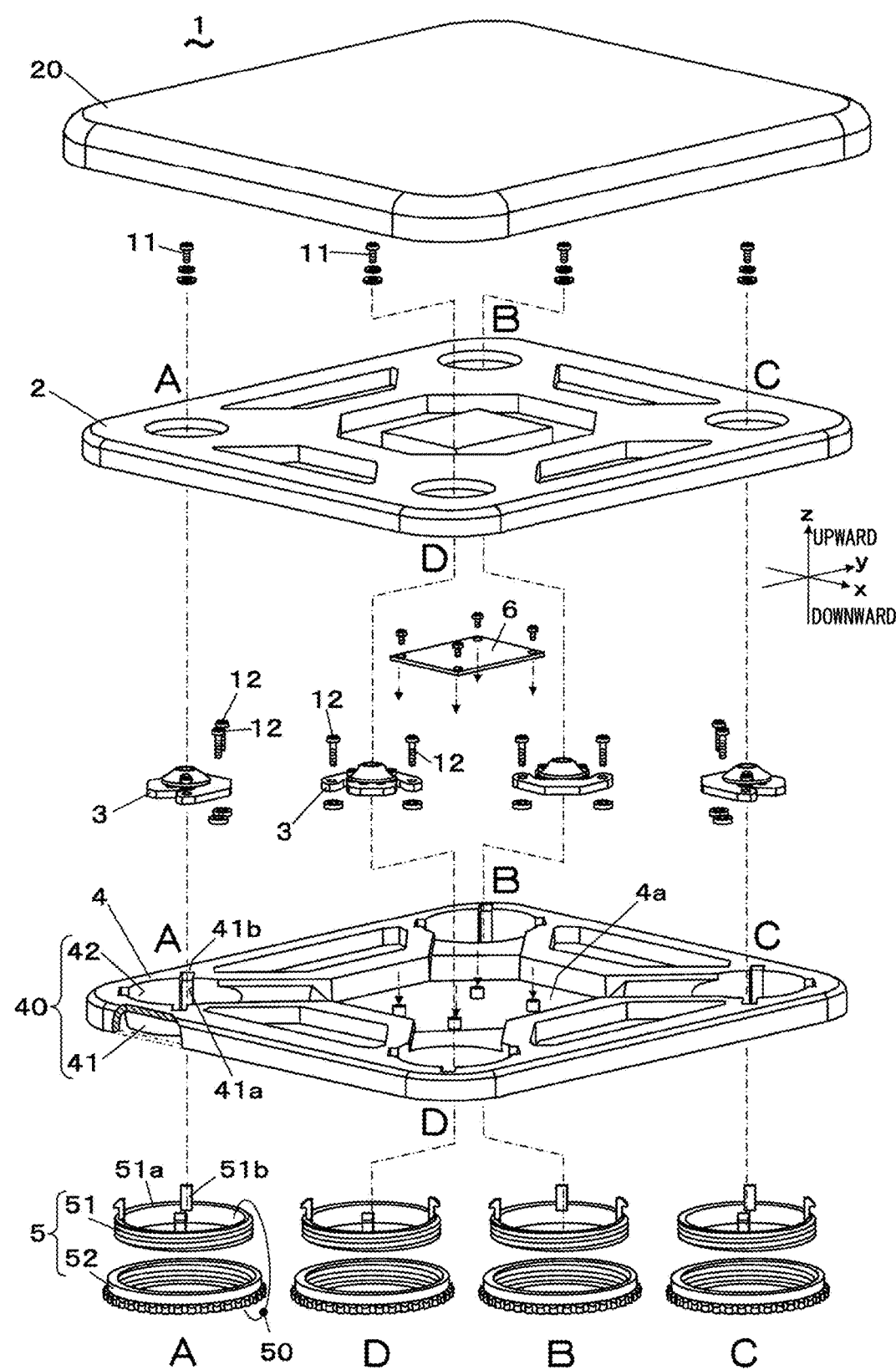
FIG. 1 Exploded perspective view partially broken away of a weight measurement device according to a first exemplary embodiment of the present invention.

Hereinafter, a weight measurement device and a load cell unit comprising adjustment legs according to exemplary embodiments of the present invention will be described with reference to the drawings. In the present specification, the xyz (or x'y'z') rectangular coordinate system shown in the drawings is referred to, in order to explain a spatial placement of each element of the weight measurement device and the load cell unit. Here, the positive direction of the z-axis is upward in a state in which the weight measurement device and the load cell unit are used, and reverse is downward, which are respectively noted as upward and downward on the z-axis.

First Exemplary Embodiment

Figure 2:
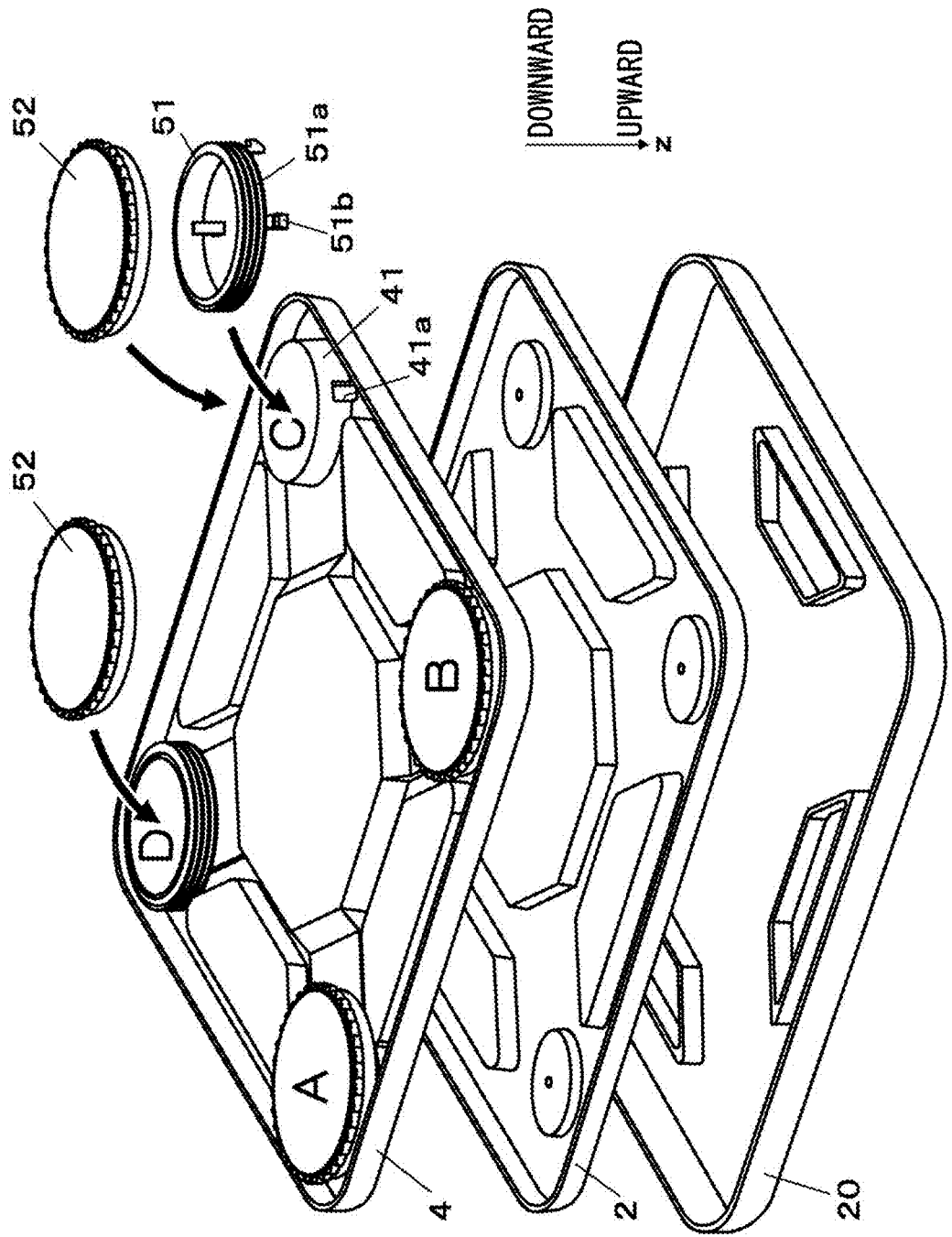
FIG. 2 Exploded perspective view of the weight measurement device seen from the back._
Figure 3:
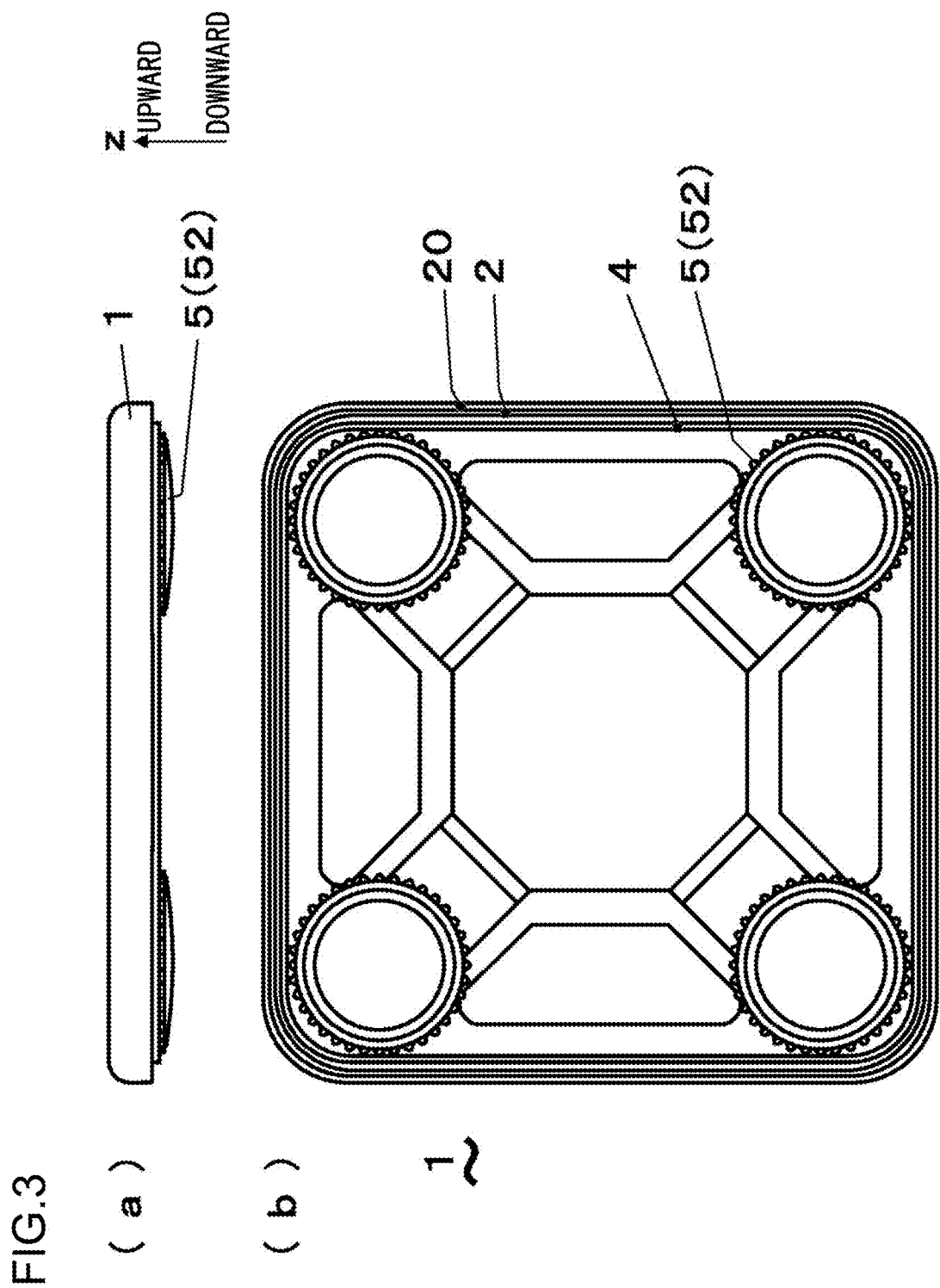
FIG. 3 (*a*) is a side view of the weight measurement device, and (*b*) is a bottom view of the weight measurement device.

FIG. 1 to FIG. 10 show a weight measurement device 1 according to a first exemplary embodiment. This weight measurement device 1 is used, for example, as a weight meter of a rectangular flat thin type and light weight portable type after being subjected to leveling adjustment. As shown in FIG. 1, FIG. 2 and FIG. 3(*a*), (*b*), the weight measurement device 1 comprises a housing cover 2, multiple (four in the present embodiment) load cells 3 to support the housing cover 2 and detect the weight of a measurement target, a housing base 4 to fix and hold the load cells 3, and adjustment legs 5 for leveling adjustment. Further, the weight measurement device 1 comprises a decorative cover 20 on the housing cover 2.

The housing cover 2 is an element to receive the weight and transfer the weight to the load cells 3, and is fixed to the load cells 3 with screws 11. The housing cover 2 is an element supported and fixed by only the load cells 3. The housing cover 2 has a sufficient strength to be able to receive the weight, and has a rigid structure to be able to suppress its deformation, and is formed, for example, by a steel plate. Further, the housing cover 2 can be formed by a resin such as CFRP resin with a sufficient mechanical strength.

The decorative cover 20 is an element supported by only the housing cover 2 and fixed to only the housing cover 2. The decorative cover 20 is, for example, an element allowing the legs of a subject measured for weight to be placed on, thus contacting the legs. Further, the decorative cover 20 covers a recessed and projected surface shape of the housing cover 2 to form a flat surface, thereby having an aesthetic function and having a surface easy for cleaning so that the contact surface with the legs of the measured subject can be kept clean. The decorative cover 20 is formed, for example, by resin molding of ABS resin or the like.

The housing base 4 has a substantially rectangular and flat outer shape seen in the z-axis in the drawings, and is an element to receive the weight applied to the housing cover 2 through only the load cells 3. At the respective corners of the rectangle, the housing base 4 comprises multiple (four in the present embodiment) recessed and projected shape parts 40 which are projected downward. Each of the respective recessed and projected shape parts 40 comprises a recessed part 42 open upward, and a projected part 41 projected downward corresponding to the recessed part 42. The surface of the recessed part 42 and the surface of the projected part 41 are in a relationship of front and back to each other. Note that the positions of the recessed and projected shape parts 40 (projected parts 41 and recessed parts 42) at the four corners correspond to positions A, B, C, D in the drawings.

Each of the load cells 3 is placed so that it is at least partially contained in the recessed part 42 open upward in the recessed and projected shape part 40, and is fixed to the housing base 4 with two screws 12, respectively. The total four load cells 3 at the positions A, B, C, D, are components with essentially the same structure, and are placed to be rotated by 90 degrees to each other in the adjacent order in the same rotational direction about the rotational axis in the z-axis direction. Output signals from the load cells 3 are processed by a circuit board 6 which is placed and fixed at a central recessed part 4a of the housing base 4. Details of the load cells 3 will be described later (refer to FIG. 4 to FIG. 9).

The adjustment leg 5 comprises a male screw part 51 which, when assembled to the recessed and projected shape part 40 of the housing base 4, is brought to a state where its screw groove is provided along periphery of the projected part 41, and also has a female screw part 52 which is screwed with the male screw part 51 to move up and down. The male screw part 51 and the female screw part 52 form an adjustment mechanism part 50 used to adjust height position (leveling adjustment). In the present embodiment, the male screw part 51 is formed as a component separate from the projected part 41 provided in the housing base 4. The female screw part 52 has a shape of a cover with a screw, and is an element with a shape of a bottomed cylinder comprising a screw groove inside. Each combination of the male screw part 51 and the female screw part 52 placed at each position A, B, C, D is essentially a component with the same structure. The male screw part 51 and the female screw part 52 are formed, for example, by resin molding of ABS resin or the like, but are not limited thereto, and can be any if they satisfy required mechanical strength.

The male screw part 51 comprises a cylindrical part 51*a* inserted on the outside of the projected part 41, and three engagement projections 51*b* projected from a top end of the cylindrical part 51*a*. The cylindrical part 51*a* comprises a screw groove on its outer surface. This screw groove becomes a screw groove along the outer periphery of the projected part 41 when the male screw part 51 is inserted and fixed on the outside of the projected part 41. The engagement projection 51*b* comprises a flexible engagement piece, and an engagement claw which is formed on and projected outward from a top end of the engagement piece. The respective engagement projections 51*b* are projected from the cylindrical part 51*a* at 90 degree or 180 degree intervals from each other.

In order to hold and fix the male screw part 51, the housing base 4 comprises engagement parts 41*a* to engage with the engagement projections 51*b* each at a location from an outer wall to its base of the projected part 41 of the recessed and projected shape part 40. The engagement part 41*a* is a slit-shaped hole through which the engagement projection 51*b* is inserted from the lower surface to the upper surface of the housing base 4. By inserting the male screw part 51 on the outside of the projected part 41, the engagement projection 51*b* is inserted through the engagement part 41*a*, and the engagement claw of the engagement projection 51*b* engages with an opening peripheral portion 41*b* on an upper surface of the hole of the engagement part 41*a* so as to be fixed to the housing base 4. Since the engagement projection 51*b* is inserted through and allowed to engage with the engagement part 41*a*, the male screw part 51 is prevented from falling off and rotating at the time of height adjustment by the adjustment leg 5. The engagement parts 41*a* are formed at three locations near the corner at each position A, B, C, D, respectively, corresponding to the three engagement projections 51*b* of the male screw part 51.

Figure 4:
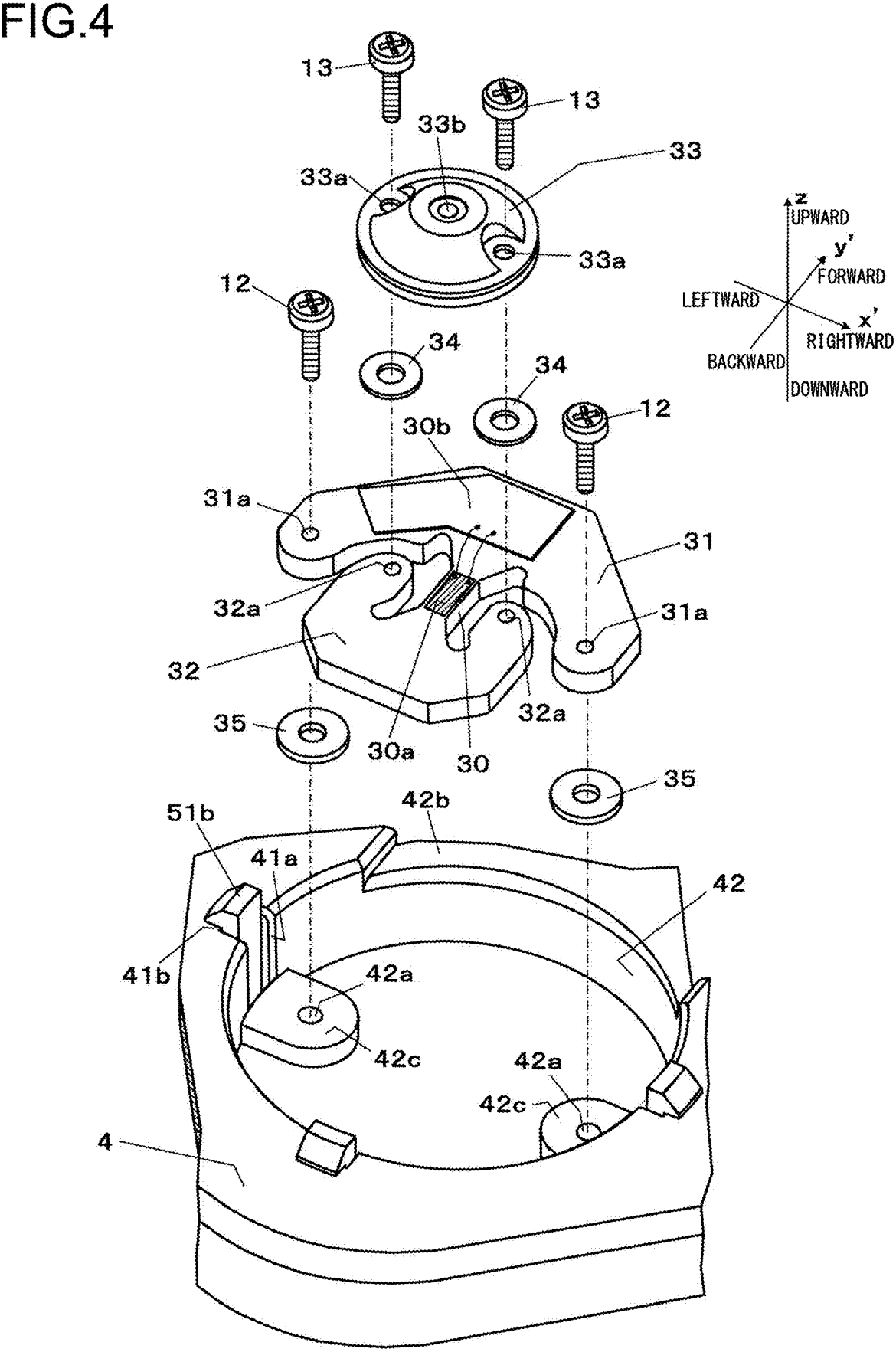
FIG. 4 Exploded perspective view of a load cell of the weight measurement device.

Next, details of the load cell 3 will be described. As shown in FIG. 4, the load cell 3 comprises a plate-shaped load cell body formed as an integration of a rectangular column-shaped strain generating part 30 placed horizontally when in use, a fixed part 31 and a movable part 32 which support both ends (fixed end and movable end) of the strain generating part 30, respectively. The load cell body is placed in parallel to the x'y'-plane perpendicular to the z-axis. The strain generating part 30 is an element which deforms as a precondition, while the fixed part 31 and the movable part 32 are elements which do not deform as a precondition. The strain generating part 30 is a part with a constant cross-section, and has ends at which the cross-section significantly changes, and which form borders with the fixed part 31 and the movable part 32. In this FIG. 4, the strain generating part 30 is placed so that its length direction is in the forward-backward direction (y'-axis) perpendicular to the upward-downward direction (z-axis), while the x'-axis is the leftward-rightward direction.

The fixed par 31 comprises arms which extend symmetrically left and right from the fixed end of the strain generating part 30 and are then bent backward, and also comprises fixing holes 31*a* near ends of the arms. Similarly, the movable part 32 comprises aims which extend symmetrically left and right from the movable end and are then bent forward, and also has fixing screw holes 32*a*. Further, the respective arms extend to side positions of the strain generating part 30 so that the centers of the two fixing holes 31*a* of the fixed part 31 and the centers of the two fixing screw holes 32*a* of the movable part 32 are contained in a plane (zx'-plane) which is perpendicular to the length direction of the strain generating part 30, and which divides the length of the strain generating part 30 into halves. In other words, the total four holes of the two fixing holes 31*a*, 31*a* and the two fixing screw holes 32*a*, 32*a* are aligned on a straight line at symmetrical positions with respect to the strain generating part 30. Note that the structure of this plate-shaped load cell body is shown as an example of one embodiment, and is not limited to the structure shown here.

The strain generating part 30 comprises a resistance-type strain gauge 30*a* intimately fixed to its upper surface. The strain generating part 30 deforms when the movable end receiving a weight moves relative to the fixed end, while the strain gauge 30*a* converts the amount of the deformation to a resistance value change. The fixed part 31 comprises a flexible board 30*b* on its surface. The strain gauge 30*a* and the flexible board 30*b* are electrically connected to each other, for example, with lead wires.

The flexible board 30*b* comprises a Wheatstone bridge circuitry, a sensitivity adjustment resistor, a temperature compensation resistor and so on which are formed by being connected to the strain gauge 30*a*, and detects a resistance value change of the strain gauge 30*a* to output a detection signal obtained corresponding to the weight. The output from the flexible board 30*b* is connected to the circuit board 6 (refer to FIG. 1) with wiring. This wiring is contained in a groove 42*b* for placing and providing wiring, the groove 42*b* being formed from the recessed part 42 of the housing base 4 to the central recessed part 4*a* of the housing base 4 to which the circuit board 6 is fixed. This groove 42*b* for placing and providing wiring forms a clearance space to prevent the wiring from contacting the housing cover 2 placed and provided upward, and further has a function as a structural body to increase the rigidity of the housing base 4.

The load cell body is fixed to the bottom part of the recessed part 42 by screwing screws 12 to screw holes 42*a* in the recessed part 42 of the housing base 4 through the fixing holes 31*a* of the fixing part 31. At this time, spacers 35 are used to prevent the movable part 32 from contacting the bottom part of the recessed part 42, while the screw holes 42*a* are formed in bases 42*c* provided at the bottom surface of the recessed part 42.

The movable part 32 comprises a weight transfer element 33 as an element for connection to the housing cover 2 located above. The weight transfer element 33 is formed by combining a metal disk functioning as a spacer and support material with a flexible and elastic truncated cone having a trapezoidal cross-section and placed on the metal disk. The weight transfer element 33 comprises two fixing holes 33*a* corresponding to the fixing screw holes 32*a* of the movable part 32, and further comprises a screw hole 33*b* at its upper central location to which the screw 11 (refer to FIG. 1 and FIG. 8) is screwed. The weight transfer element 33 is fixed to the movable part 32 by screwing screws 13 to the fixing screw holes 32*a* of the movable part 32 through the fixing holes 33*a*. At this time, spacers 34 are inserted between the weight transfer element 33 and the fixing holes 32*a*.

The spacers 34 serve to prevent the weight transfer element 33 from contacting the strain generating part 30 and so on. The metal disk of the weight transfer element 33 has the fixing holes 33*a* whose peripheries project downward, and thus function as a spacer along with the spacers 34. The center of the weight transfer element 33 is placed directly above the center of the strain generating part 30. The weight transfer element 33 receives the weight transferred from the housing cover 2 at a top part of the flexible and elastic truncated cone whose cross-section decreases as it goes upward.

Figure 5:
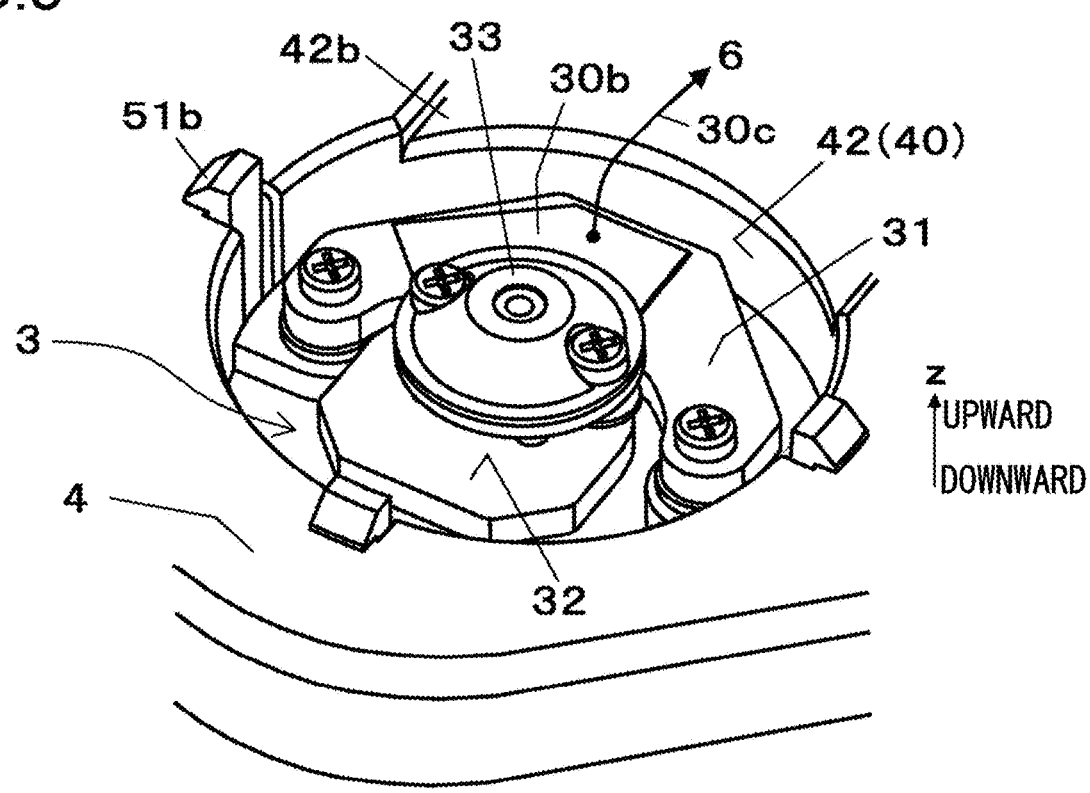
FIG. 5 Perspective view of the load cell showing a state in which it is incorporated in the weight measurement device.

FIG. 5 shows the load cell 3 placed and fixed on the recessed part 42 of the housing base 4. An arrow 30*c* in this Figure shows a wiring from the flexible board 30*b* to the circuit board 6 through the groove 42*b* provided in the housing base 4.

Figure 6:
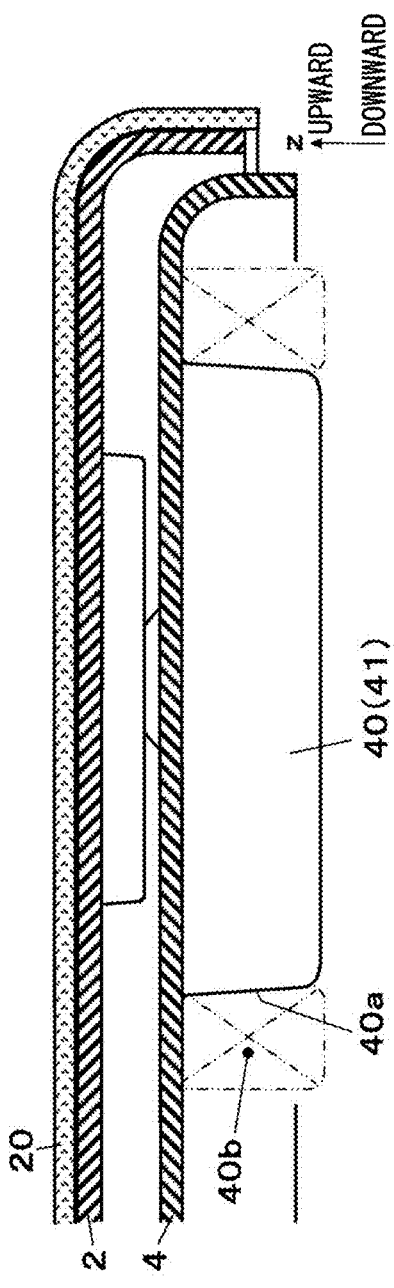
FIG. 6 Cross-sectional view explaining a side part of a recessed and projected shape part of the weight measurement device.

Next, the adjustment leg 5, a structure to house and attach the load cell 3, and the leveling function to horizontally place the device using the adjustment leg 5 in the weight measurement device 1 will be described. First, a basic concept for placing the adjustment leg 5 will be described. As shown in FIG. 6, the recessed and projected shape part 40 of the weight measurement device 1 comprises a side space 40*b* extending from its side part 40*a*, which is an outer surface of its side wall, to outward. This side space 40*b* is present as a free space surrounding the projected part 41 of the recessed and projected shape part 40.

Figure 7:
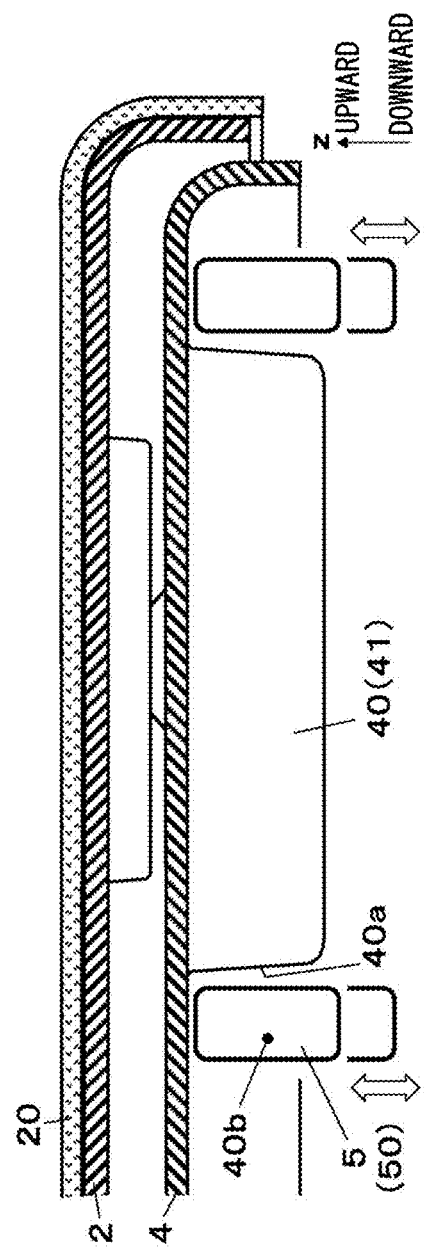
FIG. 7 Cross-sectional view conceptually explaining an adjustment leg and its operation in the weight measurement device.

As shown in FIG. 7, the adjustment leg 5 is placed in the side space 40*b* as a free space so as to surround the recessed and projected shape part 40. Thus, the adjustment leg 5 is placed to comprise the adjustment mechanism part 50 for adjusting height position at a position opposed to the side part 40*a* of the recessed and projected shape part 40 in contact with or separate from the side part 40*a* so as to contain at least a part of the recessed and projected shape part 40. The adjustment mechanism part 50 in the present embodiment is formed by a pair of screw parts of the male screw part 51 and the female screw part 52 which are screwed with each other so as to move relatively upward and downward (FIG. 1).

The adjustment mechanism part 50 using the pair of screw parts can continuously adjust height by continuously and arbitrarily rotating the female screw part 52.

Figure 8:
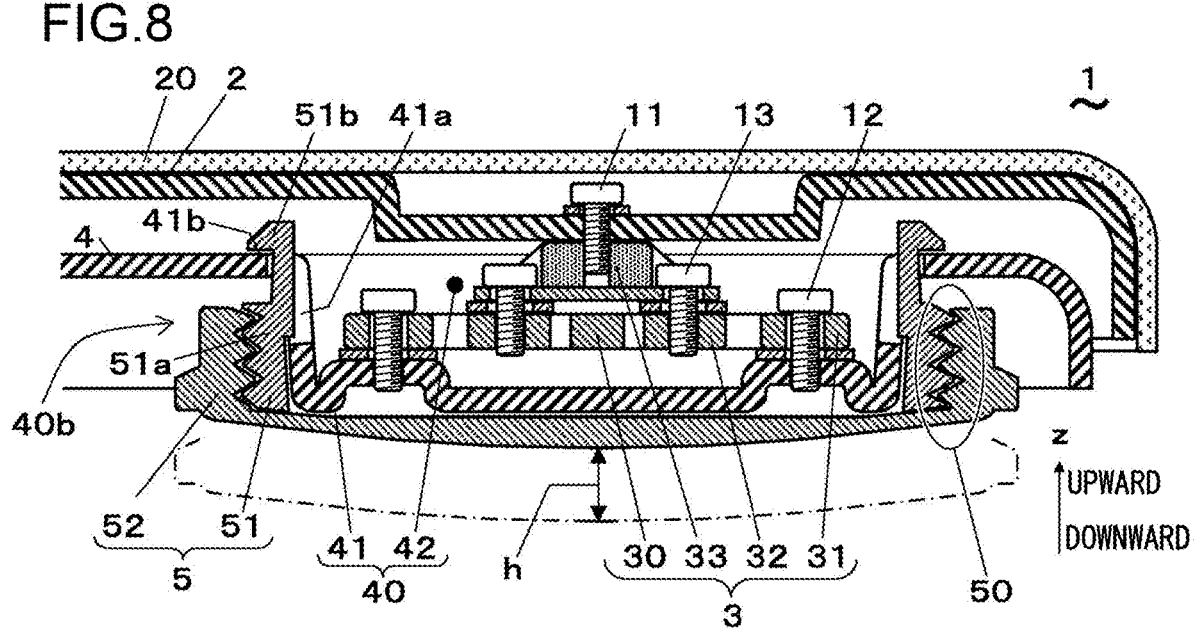
FIG. 8 Cross-sectional view of a part of the weight measurement device including the adjustment leg and the load cell.
Figure 9:
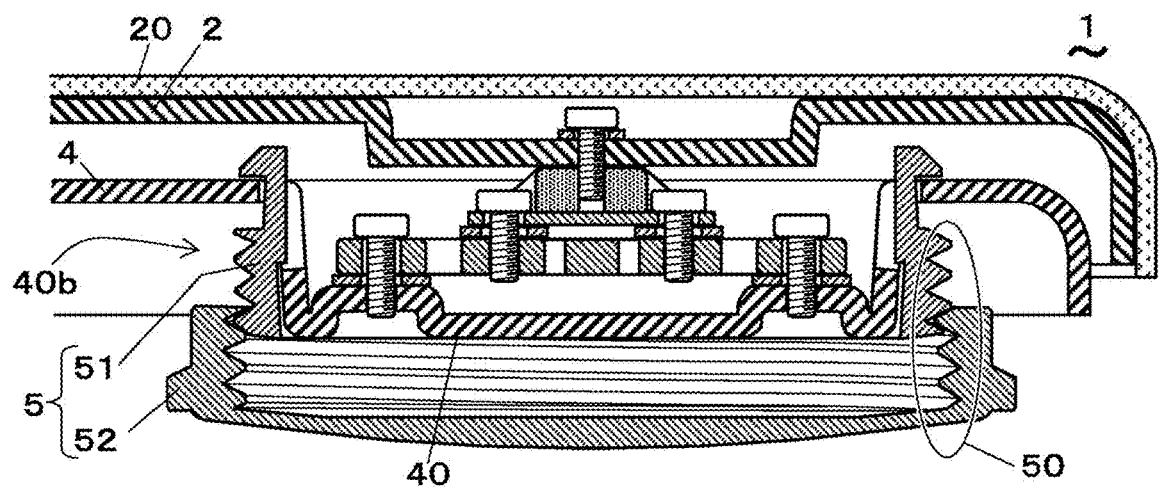
FIG. 9 Cross-sectional view showing a state in which the adjustment leg of FIG. 8 is extended.

As shown in FIG. 8 and FIG. 9, the load cell 3 is housed and attached to the recessed part 42 of the recessed and projected shape part 40 having a bottomed cylindrical shape and formed in the housing base 4. The recessed part 42 comprises a bottom surface and an upright surface formed of an inner surface of the side wall. The load cell 3 is fixed to the bottom surface of the recessed part 42 while being surrounded and protected by the upright surface of the recessed part 42.

In the present embodiment, the load cell 3 is contained and fixed in the recessed part 42 in the state where an upper part of the weight transfer element 33 projects upward from the open upper surface of the recessed part 42. Thus, it is sufficient if at least a part of the load cell 3 is contained in the recessed part 42 without requiring the entire load cell 3 to be contained in the recessed part 42. The housing base 4 is formed by CFRP, steel plate or the like. The recessed part 42 comprising the upright surface inside forms the projected part 41 projected downward as seen from outside. The projected part 41 has a taper shape whose outer diameter decreases from the upper part to lower part. Using the outer shape of this projected part 41 as a guide surface, the male screw part 51 is inserted outside the projected part 41. Thus, the male screw part 51 is placed in the side space 40*b* present at a position opposed to the side part 40*a* (refer to FIG. 7) of the recessed and projected shape part 40.

The cylindrical part 51*a* of the male screw part 51 is fit to the projected part 41 so as to support the weight applied to the projected part 41 (this cylindrical part 51*a* being supported from below by the female screw part 52). It is possible to design that the cylindrical part 51*a* has a taper-shaped inner surface shape matching the outer surface shape of the projected part 41 so as to support a part or all of the weight with its inner surface. It is also possible to design to allow a top end surface of the cylindrical part 51*a* to support a part or all of the weight applied to the housing base 4. The engagement projection 51*b* of the male screw part 51 is inserted through the engagement part 41*a* as a through-hole formed in the housing base 4 so as to engage with the opening peripheral portion 41*b*, thereby contributing to prevent the male screw part 51 from falling off and rotating. The female screw part 52 is screwed with (rotationally screwed to) the male screw part 51 mounted on the housing base 4 by matching the mutual screw groove and screw thread. It is possible to design that the male screw part 51 is mounted on the housing base 4 in the state where the male screw part 51 is integrated with the male screw part 52 by screwing them with each other. It is also possible to design that the female screw part 52 is screwed with the male screw part 51 after only the male screw part 51 is mounted on the housing base 4.

Figure 10:
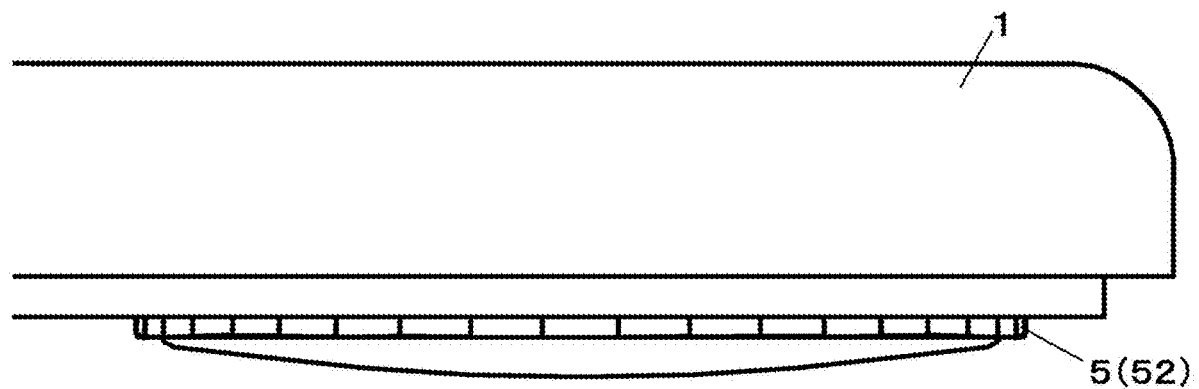
FIG. 10 Side view showing an appearance of FIG. 8.

When the adjustment leg 5 is mounted on the projected part 41 of the housing base 4, the height position of the projected part 41, namely of the recessed and projected shape part 40, can be adjusted by rotating the female screw part 52. In other words, the male screw part 51 and the female screw part 52, which are a pair of screw parts screwed with each other, form the adjustment mechanism part 50 to adjust the height position. A margin h of height position adjustment is a difference in height of the projected part 41 between when the adjustment leg 5 is most shortened (FIG. 8) and when it is most extended (FIG. 9), and is a design parameter determined by a mesh range of the mutual screws of the male screw part 51 and the female screw part 52. The weight measurement device 1 of the present embodiment comprises the four projected parts 41, and the adjustment legs 5 provided to them, respectively, are used to adjust the height positions of the projected parts 41 so as to make it possible to perform a leveling operation of the weight measurement device 1 to place it horizontally. FIG. 10 shows a state where the adjustment leg 5 is most shortened to lower the height position of the projected part 41 most.

MODIFIED EXAMPLES

Next, referring to FIG. 11 and FIG. 12, a modified example of adjustment legs 5 for height adjustment in the weight measurement device 1 will be described. Each adjustment leg 5 shown in FIG. 11 has a male screw part 51 fixed to a bottom part of each projected part 41 of the housing base 4 with screws 14. Instead of the engagement part 41*a* formed at a periphery of the base of the projected part 41, the housing base 4 comprises screw holes 41*c* to fasten screws 14 in the bottom part of the projected part 41. Further, instead of the engagement projections 5*b* projected from the top end of the cylindrical part 51*a*, the male screw part 51 comprises a bottom plate 51*c* to cover a lower end of the cylindrical part 51*a*. The bottom plate 51*c* comprises through-holes 51*d* to pass the screws 14. The male screw part 51 is fixed to the projected part 41 by fixing the bottom plate 51*c* to the bottom part of the projected 41 with the screws 14 fastened to the screw holes 41*c* through the through-holes 51*d*. The bottom plate 51*c* for screwing is provided on an entire surface of the cylindrical part 51a of the male screw part 51 so as to cover one end of the cylindrical part 51a.

Another example of adjustment legs 5 will be described. Since it is sufficient if each male screw part 51 can be prevented from falling off and rotating by being fixed to the projected part 41, it is not required to comprise a bottom plate on its entire surface as shown in FIG. 11. Thus, as shown in FIG. 12, tongue pieces 51e with holes for inserting screws can be provided to a bottom part of the cylindrical part of the male screw part 51. It is possible that the tongue piece 51e has a minimum area and thickness with required strength. Further, by providing recessed parts in an outer surface of the bottom part of the projected part 41, and by fitting the tongue pieces 51e to the recessed parts to fix the male screw part 51, the projected part 41 can be suppressed from increasing in leg length and the male screw part 51 can be prevented from rotating. In this case, the fixing can also be done with an adhesive without using the screws 14.

Further, it is also possible that by separating the function of preventing the falling off and the function of preventing the rotation of the male screw part 51, the respective functions are achieved by simple mechanisms. For example, the falling off can be prevented by a simple engagement mechanism using a screw or claw, while the rotation can be prevented by providing an inner surface of the male screw part 51 and an outer surface of the projected part 41 with a structure of a combination of a key groove and a key or with a recess-projection engagement structure.

Still another example of the adjustment leg 5 can be that the male screw part 51 is adhered and fixed to an outer periphery of the projected part 41 without using the engagement projection 51b and the screws 14. Further, it is also possible that the male screw part 51 is not separate from the projected part 41, but a screw groove and a screw thread are directly formed on an outer periphery of the projected part 41 so as to form the male screw part 51. In this case, the screw groove and the screw thread can be continuous or not continuous, respectively, by one rotation of the screw or more. For example, it is possible that the projected part 41 has an outer shape of polygonal column instead of cylinder, in which a screw is provided at each corner of the polygonal column shape. More generally, it is sufficient if a screw-shaped structure to screw with the female screw part 52 is formed on a surface of the projected part 41 so as to move the female screw part 52 up and down in the length direction of the projected part 41 by rotating the female screw part 52.

In the weight measurement device 1 of the present embodiment, a signal from each load cell 3 is processed by the circuit board 6 to obtain a weight measurement result, and the weight measurement result is sent outside from the circuit board 6. The weight measurement device 1 can comprise a display unit integrally with the housing base 4 to display the weight measurement result. In this case, it is possible, for example, that the housing base 4 comprises an extension part extended outside from the housing cover 2 and the decorative cover 20 without interfering with the housing cover 2 and the decorative cover 20, and the extension part comprises the display unit.

Further, the weight measurement device 1 can also be designed so that the display unit is not provided integrally with the housing base 4, but the circuit board 6 is electrically connected to a display box provided separately from the housing base 4 with a wiring cable or by wireless communication so as to display the weight measurement result on a display unit of the display box.

According to the weight measurement device 1 of the present embodiment, the load cell 3 is fixed to the recessed part 42, open upward, of the recessed and projected shape part 40, and the adjustment leg 5 comprising the adjustment mechanism part 50 for height position adjustment is provided to surround the recessed and projected shape part 40 in the side space 40b as a space present at a position opposed to a side part of the projected part 41 projected downward corresponding to the recessed part 42 of the recessed and projected shape part 40 provided in the housing base 4, and therefore, it is possible to obtain a given performance, and achieve a reduction in the total thickness. Further, it is possible to achieve a reduction in weight of the housing base 4 based on a reinforcement structure by the recessed part 42 and the projected part 41 of the recessed and projected shape part 40, and therefore, the weight measurement device can comprise the adjustment legs 5, while obtaining a given performance, without increasing the weight of the device.

Second Exemplary Embodiment

FIGS. 13(a) and (b) show a part including an adjustment leg 5 and a load cell 3 of a weight measurement device 1 according to a second exemplary embodiment of the present invention. The weight measurement device 1 of the present embodiment is formed by reversing the mutual roles of the male screw part 51 and the female screw part 52 forming the pair of screw parts in the first exemplary embodiment. More specifically, in the first exemplary embodiment, the male screw part 51 is fixed to the housing base 4, and the female screw part 52 is rotated to move up and down relative to the housing base 4, whereas in the present embodiment, the female screw part 52 is fixed to the housing base 4, and the male screw part 51 is rotated to move up and down.

This will be described in detail. The male screw part 51 is formed by integrating a cylindrical part 51a comprising a male screw on its outer periphery, a bottom plate 51f to cover a lower part of the cylindrical part 51a, and a flange part 51g with a shape that the bottom plate 51f extends outward. The male screw part 51 is configured to contain almost the entire projected part 41 of the recessed and projected shape part 40 inside the cylindrical part 51a.

The female screw part 52 is formed by a cylindrical screw part 52a comprising a female screw on an inner periphery of a cylinder, and attachment pieces 52b each projected sideward from an upper end side of the cylindrical screw part 52a. The attachment piece 52b comprises a through-hole for inserting a rivet 52c. The female screw part 52 has a structure to be able to contain the projected part 41 of the recessed and projected shape part 40 and the cylindrical part 51a of the male screw part 51 inside the cylindrical screw part 52a, and is placed in a side space 40b as a space at a position opposed to a side part of the recessed and projected shape part 40 (projected part 41) so as to contain them.

The female screw part 52 is fixed to the housing base 4 by using a plurality of attachment pieces 52b and rivets 52c. The female screw 52 is coaxial with the projected part 41 of the recessed and projected shape part 40. The attachment pieces 52b can be of multiple and separate tongue piece shapes each comprising a through-hole provided on the upper end side of the cylindrical screw part 52a, or can be a continuous flange. The fixing with the attachment pieces 52b and the rivets 52c functions to prevent the female screw part 52 from falling off from the housing base 4, and prevent the female screw part 52 from rotating when screwed with the male screw part 51.

The fixing of the female screw part 52 to the housing base 4 is not limited to this, and any fixing method can be used if it can prevent the falling off and the rotation. For example, the fixing can be done with screws. Further, it is possible that a projection is provided on an upper end surface of the cylindrical screw part 52a, and a hole for the projection to be fit in is provided in the housing base 4 so as to form a rotation prevention structure. Further, instead of the fixing structure using the attachment pieces 52b and the rivets, it is possible that multiple engagement projections 51b forming a structure to fix the male screw part 51 in the first exemplary embodiment are provided on an upper end of the cylindrical screw part 52a of the female screw part 52 as engagement projections to fix the female screw part 52 of the present embodiment. In this case, the housing base 4 is provided with engagement parts which are through-holes in which the engagement projections are inserted and engaged.

By screwing the male screw part 51 to the female screw part 52 fixed to the housing base 4 and rotating it, an adjustment mechanism part 50 is formed which moves the male screw part 51 up and down by the mutual screw parts. For example, a user can rotate the male screw part 51 by putting fingers on an outer peripheral part of the flange part 51g and holding it. A margin h of height position adjustment is determined by a mesh range of the mutual screws of the male screw part 51 and the female screw part 52.

According to the weight measurement device 1 of the present embodiment, the load cell 3 is fixed to the recessed part 42, open upward, of the recessed and projected shape part 40, and the adjustment leg 5 comprising the adjustment mechanism part 50 for height position adjustment is provided to surround the recessed and projected shape part 40 in the side space 40b as a space at a position opposed to a side part of the projected part 41, which is projected downward corresponding to the recessed part 42 of the recessed and projected shape part 40 provided in the housing base 4. Therefore, it is possible to obtain a given performance, and achieve a reduction in the total thickness. Further, it is possible to achieve a reduction in weight of the housing base 4 based on a reinforcement structure by the recessed part 42 and the projected part 41 of the recessed and projected shape part 40, and therefore, the weight measurement device 1 can comprise the adjustment legs 5, while obtaining a given performance, without increasing the weight of the device.

Third Exemplary Embodiment

FIG. 14 to FIG. 18 show a load cell unit 10 according to a third exemplary embodiment of the present invention. The load cell unit 10 comprises: a housing cover 102 to receive the weight of a measurement target; a load cell 3 to support the housing cover 102 and detect the weight; a housing base 104 to contain the load cell 3; and an adjustment leg 5 to adjust the height position of the housing base 104. The load cell unit 10 according to the third exemplary embodiment is made by taking out, from the weight measurement device 1 of the first exemplary embodiment, one load cell 3, the recessed and projected shape part 40 to contain and fix the load cell 3, the adjustment leg 5 corresponding to this recessed and projected shape part 40, and a part around the load cell in the housing cover 2 (102) and the decorative cover 20 (120), and by forming them into a unit. Thus, the adjustment leg 5 comprises an adjustment mechanism part 50 formed by the pair of screw parts of the male screw part 51 and the female screw part 52, and is placed in the side space 40b at a position opposed to the side part 40a of the recessed and projected shape part 40.

The housing base 104 comprises: a recessed and projected shape part 40 comprising a recessed part 42 and a projected part 41; and a flange part 104a with a circular outer shape extending outward from an open upper part of the recessed and projected shape part 40. The load cell 3 is contained in, and fixed to a bottom part of, the recessed part 42. The projected part 41 has an outer periphery on which the male screw part 51 of the adjustment leg 5 is held. The adjustment leg 5 is the same as the adjustment leg 5 in the first exemplary embodiment, except that here four engagement projections 51b of the male screw part 51 are formed at angular intervals of 90 degrees. The housing base 104 comprises four slit-shaped engagement parts 41a which are formed on a side wall of the recessed and projected part surrounding the load cell 3 at intervals of 90 degrees corresponding to the engagement projections 51b of the male screw part 51. The engagement part 41a is open at an upper surface of the flange part 104a of the housing base 104, and has an open peripheral part 41b with which the engagement projection 51b of the male screw part 51 engages.

Figure 11:
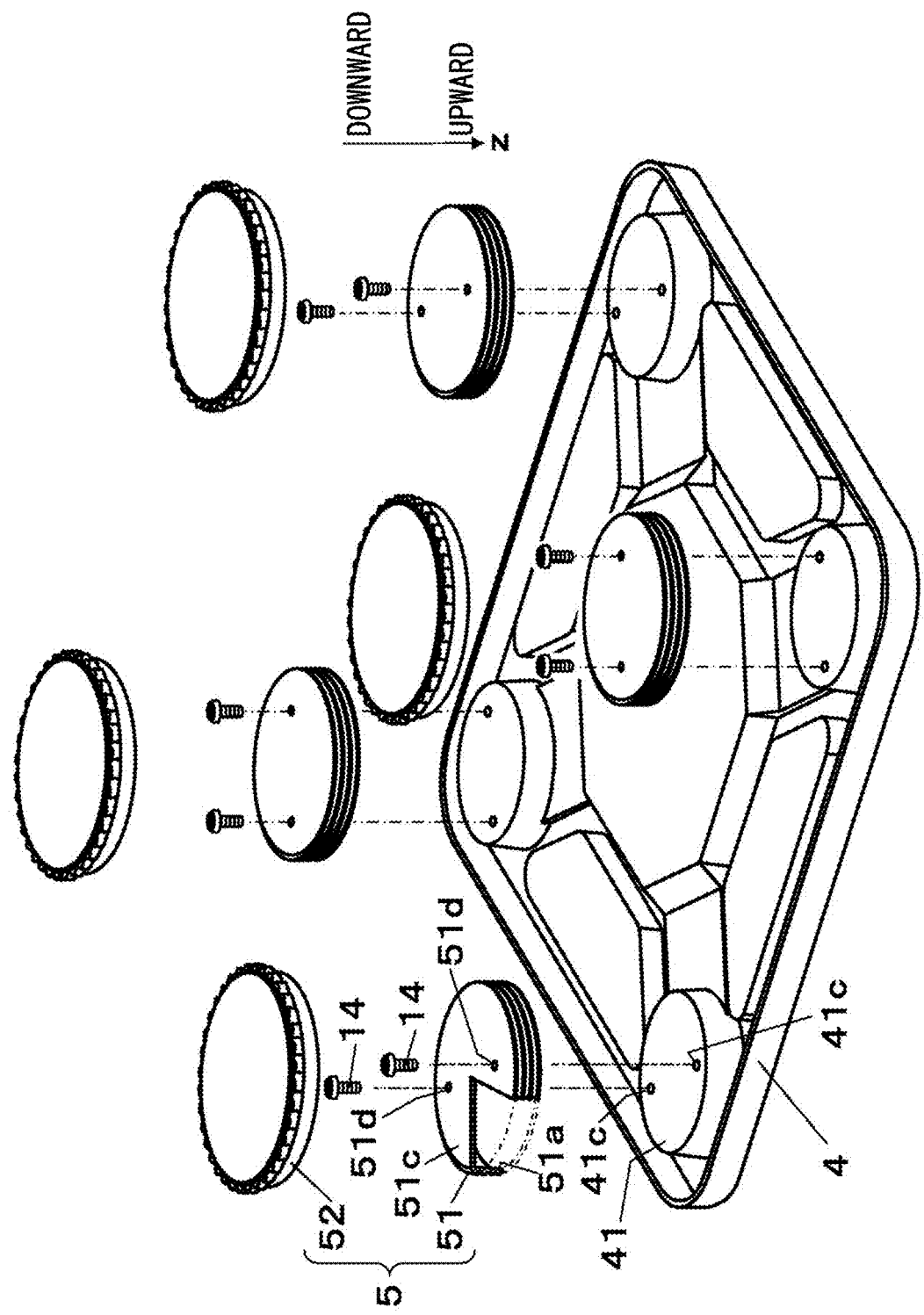
FIG. 11 Exploded perspective view partially broken away of the weight measurement device showing a modified example of the adjustment leg part.
Figure 12:
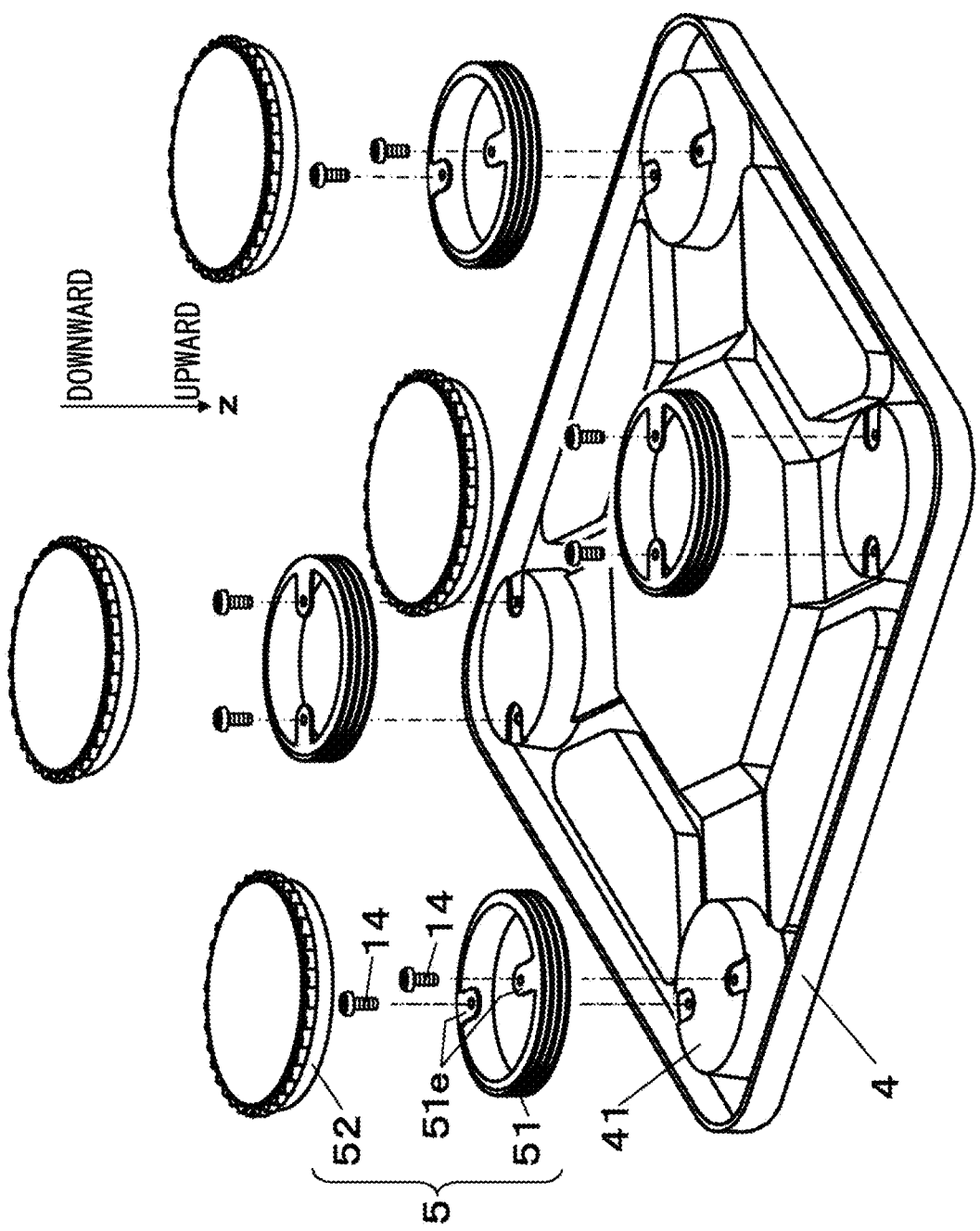
FIG. 12 Exploded perspective view of the weight measurement device showing another modified example of the adjustment leg part.
Figure 14:
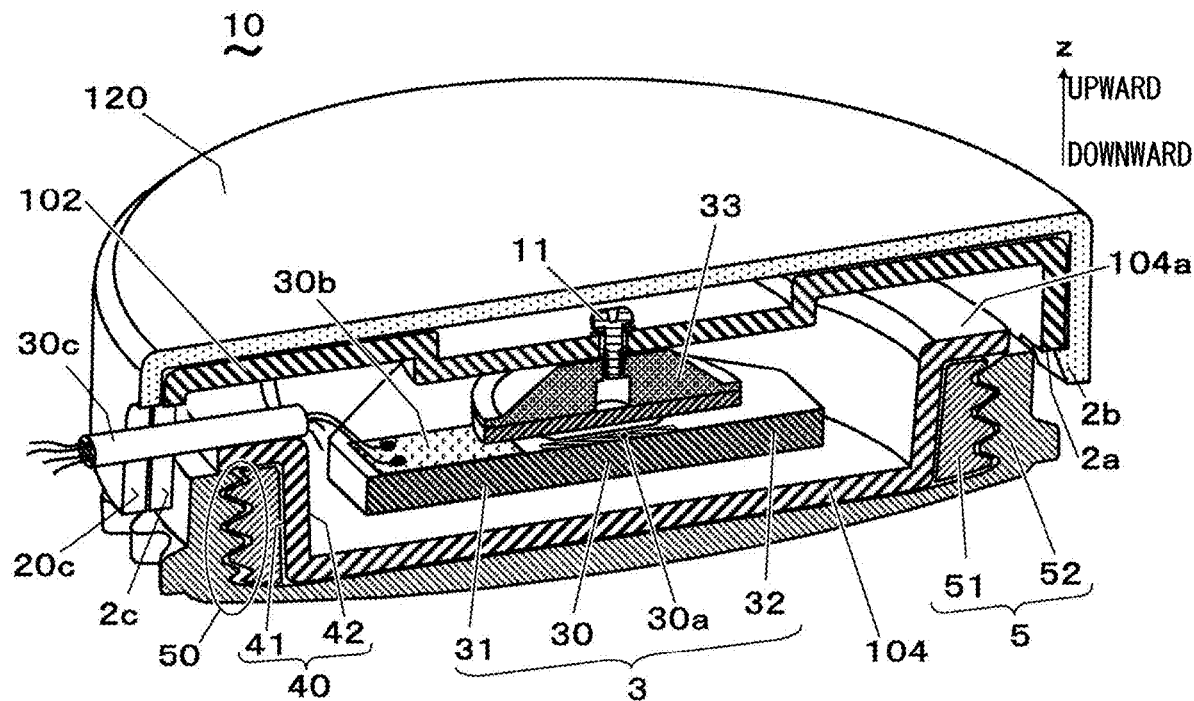
FIG. 14 Cross-sectional perspective view of a load cell unit according to a third exemplary embodiment.
Figure 15:
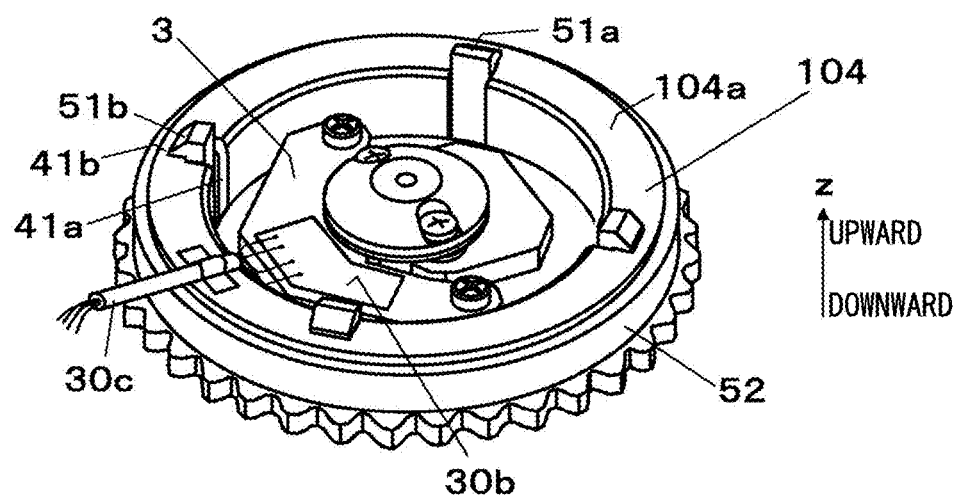
FIG. 15 Perspective view showing a state in which the load cell can be seen by removing a decorative cover and a housing cover from the load cell unit.
Figure 16:
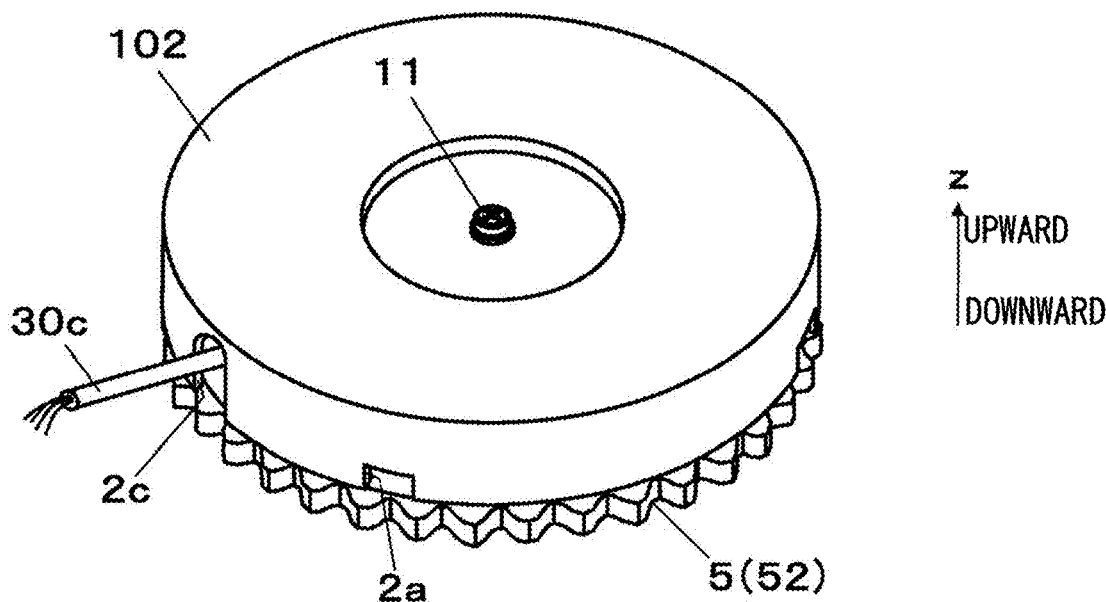
FIG. 16 Perspective view showing a state in which the housing cover is attached to the load cell unit of FIG. 15.
Figure 17:
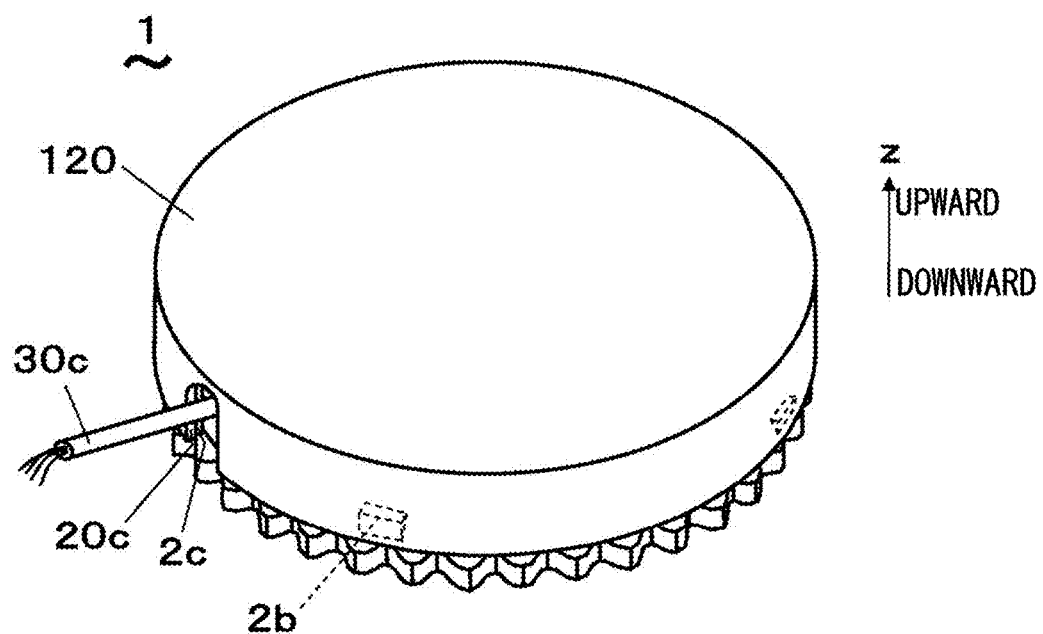
FIG. 17 Perspective view showing an appearance of the load cell unit.
Figure 18:
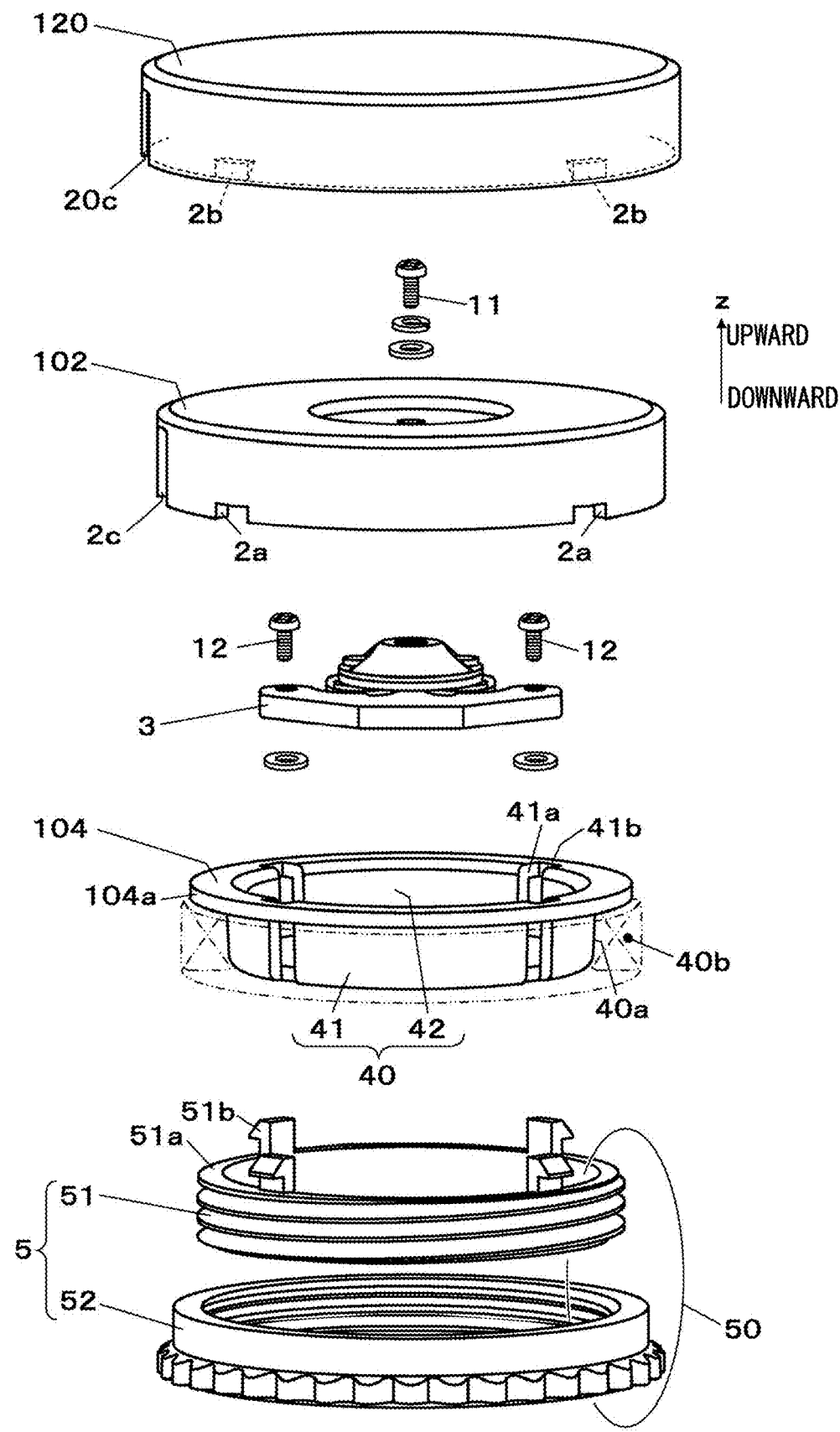
FIG. 18 Exploded perspective view of the load cell unit.

Further, also in this load cell unit 10, each modified example of the adjustment leg 5 described in relation to FIG. 11 and FIG. 12 of the first exemplary embodiment can be similarly applied. The output from a flexible board 30b provided on an upper surface of a fixed part 31 of the load cell 3 is taken out to outside the load cell unit 10 with a wiring 30c.

The housing cover 102 is a lid with a shape formed by reversing a round tray upside down, and is configured to cover the housing base 104 and the load cell 3 inside, and further cover an upper periphery of the adjustment leg 5. The housing cover 102 is fixed to an upper part of a weight transfer element 33 of the load cell 3 with a screw 11. The housing cover 102 is configured to contact only the weight transfer element 33 in order to securely transfer the weight received by its upper part to the load cell 3 without contacting the housing base 104, which form a fixed part, the wiring 30c and the adjustment leg 5.

The decorative cover 120 has a function as a design component to adjust the appearance of the load cell unit 10, or as a component to protect the load cell unit 10, and is not necessarily provided to the load cell unit 10. This decorative cover 120 is shaped to be in intimate contact with, and cover an upper surface and a side surface of, the housing cover 102. For example, the decorative cover 120 comprises engagement projections 2b at a plurality of locations on its lower end inner surface, which engage with engagement notches 2a provided at a lower end of the housing cover 102 corresponding to the engagement projections 2b, so as to be fixed and integrated with the housing cover 102.

The housing cover 102 and the decorative cover 120 comprise a notch 2c and a notch 20c to pull out a wiring in their side surfaces, respectively, and can pull out a wiring 30c outside without contacting it with the housing cover 102 and the decorative cover 120. The output signal from the load cell 3, which is output to outside the load cell unit 10 with the wiring 30c, is sent to a control device (display box) provided with a circuit board 6 and the like in the first exemplary embodiment to perform signal processing, display and so on. A plurality of the load cell units 10 are collectively used as components to form the weight measurement device, namely a platform scale, by being connected to a display box to process the output signal from each load cell 3.

Note that the adjustment leg 5 comprising the adjustment mechanism part 50 of the load cell unit 10 is not limited to the one shown in the present embodiment. For example, it can be configured so that like the adjustment leg 5 in the second exemplary embodiment, the female screw part 52 is fixed to the housing base 104, and the male screw part 51 is rotated to move up and down. Further, the adjustment mechanism part 50 for height position adjustment is not limited to the one formed by a pair of screw parts, but can use a mechanism which is placed in the side space 40*b* at a position opposed to the side part 40*a* of the recessed and projected shape part 40 so as to adjust an arbitrary height position.

According to the load cell unit 10 of the present embodiment, the load cell 3 is fixed to the recessed part 42, open upward, of the recessed and projected shape part 40, and the adjustment leg 5 is provided at an outer periphery of the projected part 41, which is projected downward corresponding to the recessed part 42 of the recessed and projected shape part 40 provided in the housing base 104, so as to surround the load cell 3. Therefore, it is possible to obtain a load cell unit which can obtain a given performance, and achieve a reduction in the total thickness. By combining a plurality of such load cell units 10 for use, it is possible to easily configure a thin-type weight measurement device comprising an arbitrarily shaped platform and with a leveling function.

(Weight Measurement Device Using Load Cell Units)

Figure 19:
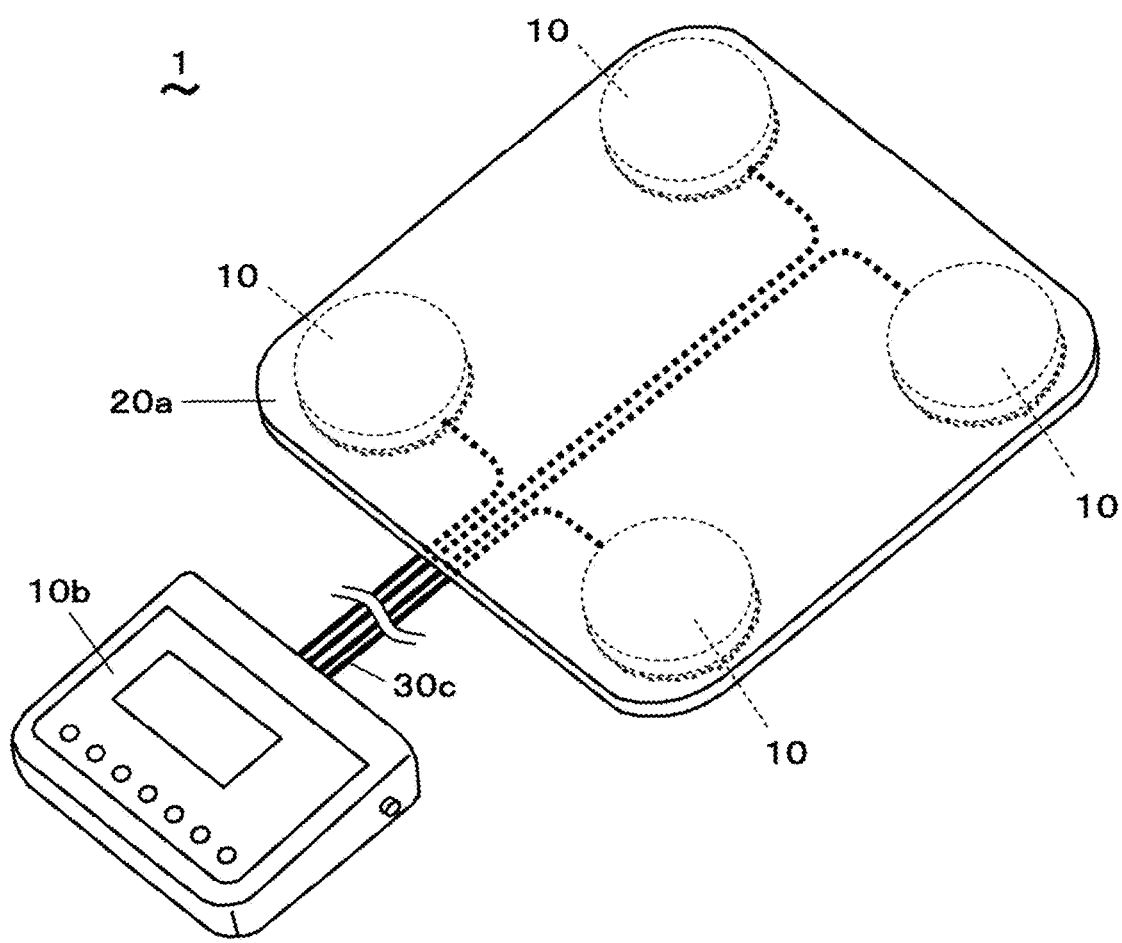
FIG. 19 See-through perspective view of the weight measurement device configured by using the load cell unit.

FIG. 19 shows a weight measurement device 1 configured by using the load cell unit 10. This weight measurement device 1 comprises: a plurality of (four in the present embodiment) load cell units 10 placed in plane; and a common cover 20*a* placed on the respective housing covers 102 (or decorative covers 120) (refer to FIG. 14, FIG. 16 and FIG. 18) of the load cell units 10 so as to integrate the respective housing covers 102 (or decorative covers 120) with each other. The common cover 20*a* is rectangular plate-shaped, and provided with the load cell units 10 at its four corners. The load cell units 10 have a function as support legs to share and receive the weight received by the common cover 20*a*. The support legs can be adjusted in height position by using the adjustment legs 5 of the load cell units 10.

Further, the weight measurement device 1 comprises a display box 10*b* connected to the wiring 30*c* pulled out from each load cell unit 10. The display box 10*b* comprises a circuitry and a processor which are used to process an output signal from each load cell unit 10 obtained through the wiring 30*c*, and to calculate a weight applied to the common cover 20*a*, and further comprises a display to display obtained weights and so on. Such a weight measurement device 1 achieves a device provided with a leveling function and reduced in thickness.

It is also possible that the housing cover 102 of the load cell unit 10 in this weight measurement device 1 is directly fixed to the common cover 20*a* without providing the decorative cover 120. It is also possible that the weight measurement device 1 with such configuration is formed by combining an arbitrary number of the load cell units 10, and fixing them to the common cover 20*a* with an arbitrary shape. For example, the common cover 20*a* can have a slender-shape, a circular-shape, a ring-shape or the like which matches a mutual contact structure of a measurement target and the common cover 20*a* when the measurement target is placed on the common cover 20*a*, or when the measurement target steps on the common cover 20*a*. By using the load cell units 10 comprising the adjustment legs 5 capable of height adjustment and formed into a unit, the weight measurement device 1 comprising the common cover 20*a* (platform) with an arbitrary shape and reduced in thickness can be easily achieved.

It is also possible that in the weight measurement device according to the present invention, a level to evaluate a leveling state at the time of height position adjustment (leveling) using the adjustment legs 5 is provided on the housing cover 2 or the housing base 4. Further, instead of the load cell 3 with a configuration using the strain gauge described above, the weight measurement device and the load cell unit of the present invention can also use a load cell with another arbitrary configuration which can be at least partially contained in the recessed and projected shape part 40.

Further, the adjustment mechanism part 50 for height position adjustment is not limited to the configuration using a pair of screw parts which are screwed with each other to move up and down, and can also be a configuration using a combination of a pin and a groove or hole in which the pin slides or is fixed. Such adjustment mechanism part 50 is placed in the side space 40*b* present at a position opposed to the side part 40*a* of the recessed and projected part 40 as shown in FIG. 6 and FIG. 7.

This will be described more generally. The adjustment leg 5 comprises an adjustment mechanism part 50 for height position adjustment. The adjustment mechanism part 50 is a mechanism part placed in the side space 40*b* present at a position opposed to the side part 40*a* of the recessed and projected shape part 40, and comprises a fixed element fixed to the housing base 4, and a moving element movable up and down relative to the fixed element. The moving element can move up and down relative to the fixed element, and is fixable at given multiple positions. This fixability means that the fixed state can be maintained even if receiving a weight of the measurement target in the fixed state.

When such adjustment mechanism part 50 is configured by using a pin and a groove, it is possible to configure, for example, that the moving element and the fixed element form a coaxial inner and outer double cylindrical structure, in which one of them moves and is fixed to the other. For example, the pin is provided upright from an inner surface to inside of the cylinder, or from an outer surface to outside of the cylinder. The structure of the groove can be designed so that a groove for the pin to move in is spirally formed in an inner surface or an outer surface of the cylinder, while recesses for the pin to be fit into are provided in the spiral groove at appropriate intervals, and that the pin is fixed (retained) by fitting the pin into the recess. For moving the pin, the pin can be lifted up to escape from the recess. The spiral groove can be replaced by a stair-shaped groove. Each step of the stair can be provided with a slope or a recess to fix the pin. Further, as another groove structure which follows the manual gear change mechanism of a car, it is possible, for example, that a groove for the pin to move upward and downward and a plurality of circumferential direction grooves to fix the pin are provided on an inner surface or an outer surface of the cylinder so as to make it possible to adjust the height position by combining these grooves.

DESCRIPTION OF THE REFERENCE NUMERALS

1 Weight measurement device
10 Load cell unit
2,102 Housing cover
20*a* Common cover
3 Load cell 4,104 Housing base
40 Recessed and projected shape part
40a Side part
40b Side space
41 Projected part
41a Engagement part
42 Recessed part
5 Adjustment leg
50 Adjustment mechanism part
51 Male screw part
51a Cylindrical part
51b Engagement projection
52 Female screw part

The invention claimed is:

1. A weight measurement device comprising:
a housing cover to receive weight of a measurement target;
a plurality of load cells to support the housing cover and detect the weight;
a housing base comprising, for each of the plurality of load cells, a recessed and projected shape part comprising: a recessed part open upward to at least partially contain each load cell and fix the load cell; and a projected part projected downward corresponding to the recessed part, wherein a surface of the recessed part is situated inside the recessed and projected shape part, and a surface of the projected part is situated outside the recessed and projected shape part opposing the surface of the recessed part; and
an adjustment leg which at least partially contains the recessed and projected shape part, and comprises an adjustment mechanism part for height position adjustment at a position opposed to a side part of the recessed and projected shape part.

2. The weight measurement device according to claim 1, wherein the adjustment mechanism part is a pair of screw parts screwed with each other to move up and down.

3. The weight measurement device according to claim 2, wherein the pair of screw parts are a male screw part whose screw groove is provided along periphery of a side part of the projected part of the recessed and projected shape part, and a female screw part screwed with the male screw part to move up and down.

4. A load cell unit comprising:
a load cell to detect weight of a measurement target;
a housing base comprising a recessed and projected shape part comprising: a recessed part open upward to at least partially contain the load cell and fix the load cell; and a projected part projected downward corresponding to the recessed part, wherein a surface of the recessed part is situated inside the recessed and projected shape part, and a surface of the projected part is situated outside the recessed and projected shape part opposing the surface of the recessed part; and
an adjustment leg which at least partially contains the recessed and projected shape part, and comprises an adjustment mechanism part for height position adjustment at a position opposed to a side part of the recessed and projected shape part.

5. The load cell unit according to claim 4, wherein the adjustment mechanism part is a pair of screw parts screwed with each other to move up and down.

6. The load cell unit according to claim 5, wherein the pair of screw parts are a male screw part whose screw groove is provided along periphery of a side part of the projected part of the recessed and projected shape part, and a female screw part screwed with the male screw part to move up and down.

7. A weight measurement device comprising:
a plurality of load cell units placed in a plane; and
a common cover placed on the plurality of load cell units, wherein each of the plurality of load cell units comprises:
a load cell to detect weight of a measurement target;
a housing base comprising a recessed and projected shape part comprising: a recessed part open upward to at least partially contain the load cell and fix the load cell; and a projected part projected downward corresponding to the recessed part, wherein a surface of the recessed part is situated inside the recessed and projected shape part, and a surface of the projected part is situated outside the recessed and projected shape part opposing the surface of the recessed part; and
an adjustment leg which at least partially contains the recessed and projected shape part, and comprises an adjustment mechanism part for height position adjustment at a position opposed to a side part of the recessed and projected shape part.

8. The weight measurement device according to claim 7, wherein the adjustment mechanism part is a pair of screw parts screwed with each other to move up and down.

9. The weight measurement device according to claim 8, wherein the pair of screw parts are a male screw part whose screw groove is provided along periphery of a side part of the projected part of the recessed and projected shape part, and a female screw part screwed with the male screw part to move up and down.

10. The weight measurement device according to claim 1, wherein the recessed and projected shape part is a single part.

11. The load cell unit according to claim 4, wherein the recessed and projected shape part is a single part.

12. The weight measurement device according to claim 7, wherein the recessed and projected shape part is a single part.

* * * * *